No. 630,180. Patented Aug. 1, 1899.
J. M. CAVINS.
BELT FASTENER.
(Application filed Mar. 4, 1899.)
(No Model.)
Fig. 1.
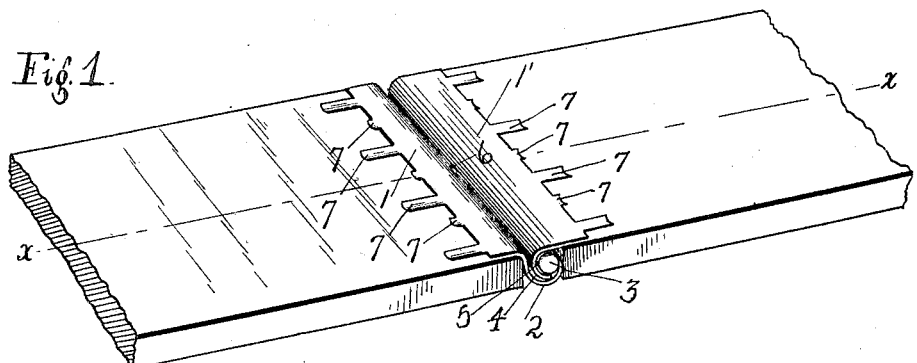
Fig. 2.
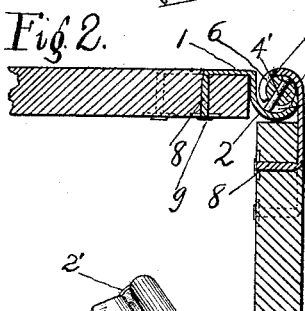
Fig. 3.
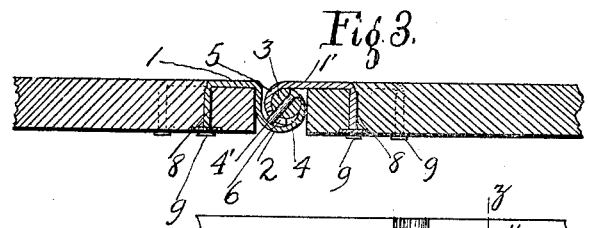
Fig. 4.
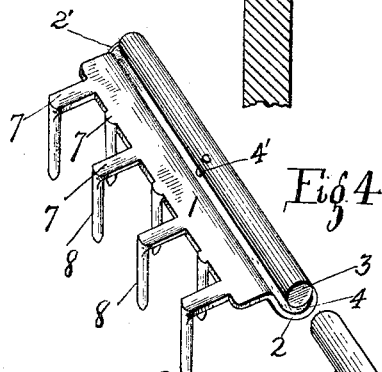
Fig. 5.
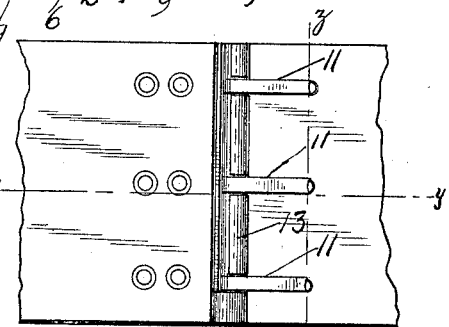
Fig. 6.
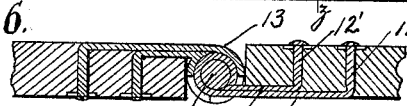
Fig. 7.
Fig. 8.
Fig. 9.
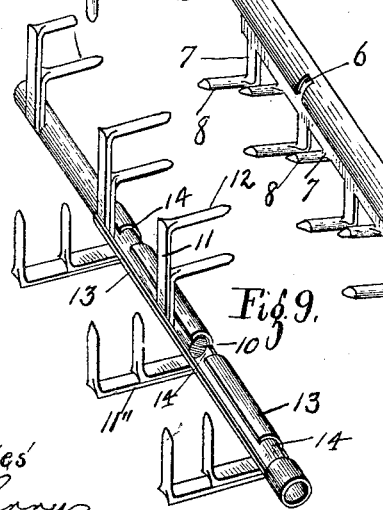
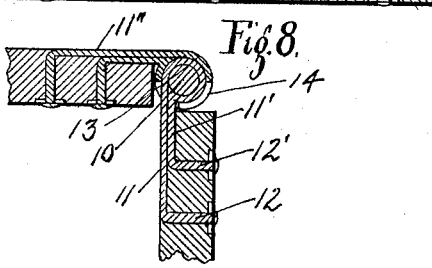
Witnesses
H. Wherry
Richd Walsh
Inventor.
John M. Cavins
By Emil Storck Attorney.
THE NORRIS PETERS CO., PHOTO-LITHO., WASHINGTON, D. C.

UNITED STATES PATENT OFFICE.

JOHN M. CAVINS, OF ST. LOUIS, MISSOURI.

BELT-FASTENER.

SPECIFICATION forming part of Letters Patent No. 630,180, dated August 1, 1899.

Application filed March 4, 1899. Serial No. 707,774. (No model.)

*To all whom it may concern:*

Be it known that I, JOHN M. CAVINS, a citizen of the United States, residing at St. Louis, State of Missouri, have invented certain new and useful Improvements in Belt-Fasteners, of which the following is a full, clear, and exact description, reference being had to the accompanying drawings, forming a part thereof.

My invention has relation to improvements in belt-fasteners; and it consists in the novel arrangement and combination of parts more fully set forth in the specification and pointed out in the claims.

In the drawings, Figure 1 is an upper perspective view of a section of a belt, showing my fastener applied thereto. Fig. 2 is a section on line X X of Fig. 1, showing the two sections of the fastener in the position for coupling. Fig. 3 is a section on the same line, showing the parts locked. Fig. 4 is a perspective of the two sections of the belt-fastener removed from the belt, showing them in position for coupling. Fig. 5 is a top plan of a belt-section fastened with a modified form of fastener. Fig. 6 is a section on line Y Y of Fig. 5, the sections of the fastener being locked, the belt being turned over. Fig. 7 is a section on line Z Z of Fig. 5, showing the prongs in elevation. Fig. 8 is a sectional view on same line as Fig. 6, but showing the parts in the act of coupling or uncoupling; and Fig. 9 is a perspective view of the sections of the modified form in the process and position of coupling but not locked, the parts being removed from the belt.

The object of my invention is to construct a belt-fastener which will effect a hinged connection between the adjacent ends of the belt fastened or coupled thereby, one which will permit the ready coupling or uncoupling of said ends, one which will permit the laps of the belt to pass over a pulley with a minimum degree of resistance, one which produces a minimum degree of stiffness on either side of the hinge-line, one which insures a maximum degree of contact between the belt and the periphery of the pulley on either side of the hinge-line, and one possessing further and other advantages more apparent from a detailed description of the invention, which is as follows:

Referring particularly to Figs. 1, 2, 3, and 4 of the drawings, 1 represents the leaf or plate of one section of the hinge, and 1' represents the leaf of the adjacent or opposite section. Disposed along the coupling longitudinal edge of the leaf 1 is a hollow groove or depression 2, the inner wall of which forms a shoulder against which the edge of the belt on that side is adapted to bear, the outer portion of the wall being bent inwardly and having secured along its inner surface a rigid cylindrical rod 3, serving for the hinge-pin, as will presently appear. The pin 3 serves as the male member of the coupling and is of such diameter as to leave a clearance 4 between it and the adjacent inner surface of the groove both below and to one side of the pin. Projecting from the pin 3, preferably from the middle of the length thereof toward the opposite inner wall of the groove 2 and of sufficient length to contact with said wall, is a peg or stud 4', the position thereof being such as not to interrupt the continuity of the clearance beneath the hinge-pin 3. The female member of the coupling is in the form of a longitudinal split or open groove or socket 5, bent from the body of the metal constituting the leaf 1' in such manner as to embrace the hinge-pin from the outside, the pin 3 being embraced about half-way around along its peripheral surface. Cut from the outer wall of the groove 5, at right angles to the free edge thereof, is a recess 6, which when the female member has been fully slipped over the male comes opposite the peg 4', previously referred to. The female is slipped over the male from one end of the latter, the parts being held while being coupled, so that the leaf 1 shall be substantially at right angles to the leaf 1', the edge of the wall of the part 5 freely riding over the peg 4' and being prevented from slipping beyond the opposite end of the groove 2 by an abutting or terminal wall 2' at the farther end of said groove 2. The member 5 having thus been fully slipped over the male member 3, the parts are swung to an angle greater than a right angle, (or to any other angles which the leaves are liable to assume in the passage of the belt over a pulley,) when the peg 4 will enter the recess 6, and thus prevent the leaves from uncoupling. Extending from the inner edge of each leaf are a series of arms 7, terminating in cylindrical prongs 8, deflected at right angles thereto, the prongs being of sufficient length to pass clear through the material of the belt, the projecting ends being subsequently expanded over suitable circular washers 9, passed over said projecting ends. The length of the arms 7 is such as to break joint at the points where the prongs 8 enter the belt, and while this arrangement in general is not new in the present invention I form the arms of such a length that the distance of the line along which the inner series of prongs enter the belt from the free edge of the belt shall be equal substantially to the thickness of the belt, and the distance between the two lines along which the inner and outer series of prongs enter the belt is likewise equal to the thickness of the belt. The theory or reason for this arrangement is that the resistance to tearing offered by the material of the belt is as great at the distance mentioned as it would be for a distance greater than the belt thickness from the edge thereof or from a line located at that distance. In the present case the several arms 7 are shown outwardly concave, the depressed portions being embedded in the material of the belt sufficiently to bring the edges of the concavity substantially flush with the adjacent surface of the belt. The object of this construction is to bring as much of the belt-surface as possible in contact with the pulley over which it passes, (the idler in the present case, for it is the opposite face which passes over the drive-pulleys,) and its virtue will be better apparent from a description of the modification illustrated in Figs. 5 to 9, inclusive, which is intended for a belt whose opposite surfaces contact with two or more different pulleys at the same time—for example, in cross-belts or belts passing over a drive-pulley and an idler at the same time or drive-pulleys located along opposite faces of the belt.

Referring now particularly to Figs. 5 to 9, inclusive, in which the leaves 1 1', characterizing the previous construction, are absent, (for a reason presently obvious,) 10 represents the hinge-pin or male member, which is formed by bending the edge of the metal from which the long arms 11 and their prongs 12 are stamped snugly over a solid cylindrical rod or pin. The arms 11 in this case are tangent to the peripheral surface of the pin 10, and the short arms 11' and prongs 12' are soldered or otherwise secured to the inner surface of the long arms. The female portion in this modified construction is composed of a longitudinally-slit tube 13, from the walls of which are cut a series of recesses 14, opening along the forward edge of the slit referred to, the latter terminating at the exterior bounding wall of one of the outer recesses 14. The object of terminating the slit at the point mentioned is to prevent the female portion passing off the male at the end opposite to that at which the female is passed over the male. As in the main construction already described, so in the present modified form the two members are coupled by holding them in such position as to bring the arms 11 of one at right angles to the corresponding arms 11'' of the other and slipping the female over the male until the outer edge of the arm 11, which is approaching toward the end or base of the longitudinal slit or tube 13, comes squarely against said base. The parts are then swung so as to cause the arms 11 to enter between the walls of the recesses 14, when the coupling is completed. Unlike the construction described in Figs. 1, 2, 3, and 4, in the present modification the bases of the arms 11 take the place of the peg (or pegs) 4', and it is for this reason the parts 1 and 1' are omitted. Furthermore, in the present form the arms 11 11'' are disposed on opposite faces of the belt, whereas in the first construction the leaves 1 1' and their arms 7 are on the same side. Where a belt must bend around two pulleys simultaneously, located on opposite sides thereof, as in the cases mentioned aforesaid, the effect is to rock the opposite sections of the hinge on each side of the general plane of the lap of the belt, and therefore by mounting the sections on opposite faces of the belt, as described, and correspondingly deepening the recesses 14 allowance is made for the greater swinging of the hinge-sections without danger of uncoupling the same.

Like the arms 7, the arms 11 11' are outwardly concave, thereby allowing the belt to freely contact with the pulleys over which it passes.

It is apparent that minor changes may be made in the present device without departing from the spirit of my invention.

Having described my invention, what I claim is—

1. A belt-fastener comprising a leaf or plate adapted to be secured to one of the ends of an open belt, a hinge-pin or rod disposed longitudinally along the outer or free edge of the plate, a peg projecting transversely across from the hinge-pin toward the body of the plate, a second leaf or plate adapted to be secured to the opposite end of the belt, a groove or socket disposed longitudinally along the free edge of said second plate, and adapted to be passed over the hinge-pin from one end thereof and embrace the same, a recess cut from the walls of the groove adjacent, and at right angles to, the free edge thereof, and at a point opposite the peg when the pin is fully inserted into the groove, the peg being adapted to lock the parts when swung to a different angle from that which the leaves subtended while the parts were being coupled, substantially as set forth.

2. A belt-fastener comprising a leaf or plate adapted to be secured to one of the ends of an open belt, a hinge-pin or rod disposed longitudinally along the outer or free edge of the plate, a peg projecting transversely across from the hinge-pin toward the body of the plate, a second leaf or plate adapted to be secured to the opposite end of the belt, a groove or socket disposed longitudinally along the free edge of said second plate, and adapted to be passed over the hinge-pin from one end thereof and embrace the same, a recess cut from the walls of the groove adjacent, and at right angles, to the free edge thereof, and at a point opposite the peg when the pin is fully inserted into the groove, the peg being adapted to lock the parts when swung to a different angle from that which the leaves subtended while the parts were being coupled and a limiting-wall at that end of the hinge-pin which is opposite to the end at which the pin was inserted, substantially as set forth.

3. A belt-fastener comprising a leaf or plate adapted to be secured to one end of a belt, a hollow groove or depression formed along its outer longitudinal edge, the inner wall of said depression forming a shoulder against which the edge of the belt end on that side is adapted to bear, a cylindrical rod or hinge-pin secured along the inner surface of the outer wall of said groove, there being left a longitudinal clearance below and to one side of the pin between it and the inner surface of the depression, a peg projecting laterally from the pin toward the surface of the inner wall of the depression, a second plate or leaf adapted to be secured to the opposite end of the belt, a longitudinally-split groove or socket formed along its outer edge, a recess formed in the outer wall of the socket at right angles to its free edge and opening into the slit thereof, the socket being adapted to be slipped over the pin when the leaves are held substantially at right angles, and locked when swung to an obtuse angle, and a limiting-wall extending from one end of the hinge-pin across the depression in which it is carried, the parts operating substantially as and for the purpose set forth.

4. In a belt-fastener, suitable arms having terminal prongs adapted to pierce the belt, the arms being concave outward, the outer edges of the concavities being substantially flush with the surface of the belt, substantially as set forth.

In testimony whereof I affix my signature in presence of two witnesses.

JOHN M. CAVINS.

Witnesses:
EMIL STAREK,
RICHD. WALSH.